Patented June 4, 1940

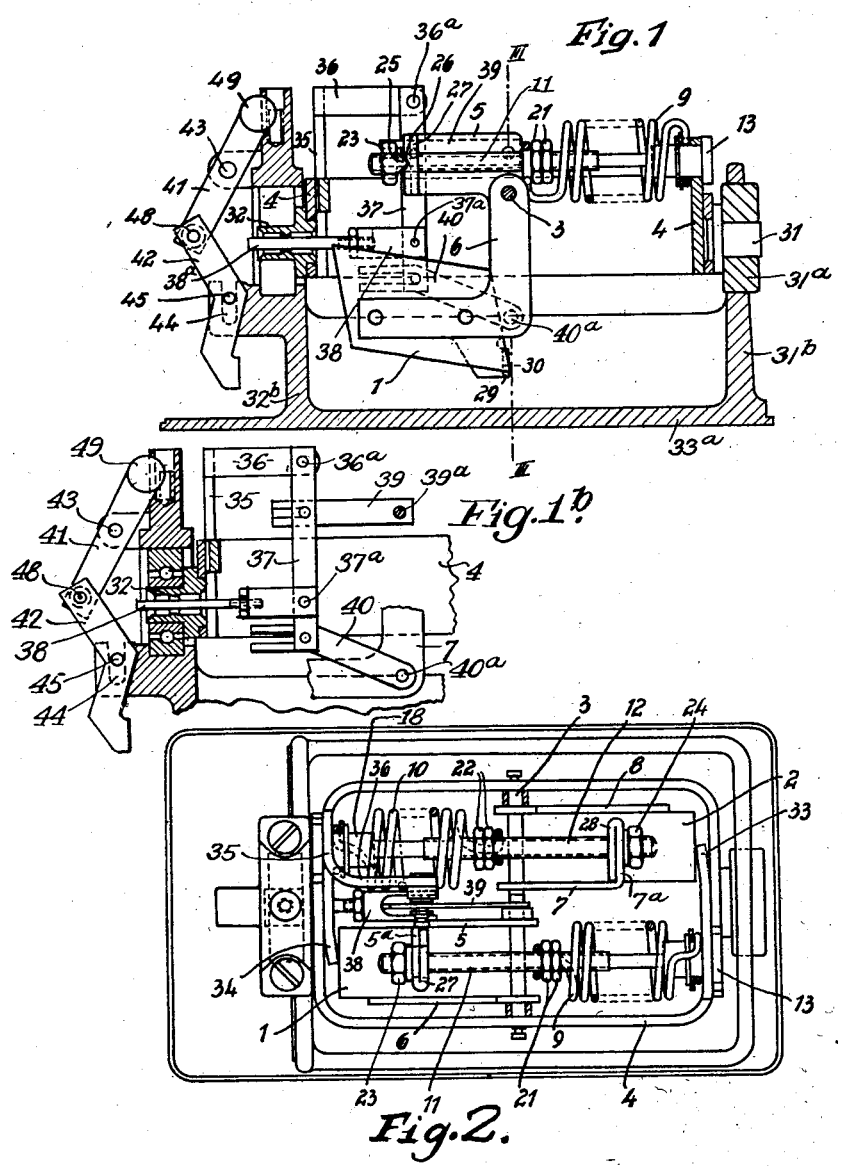

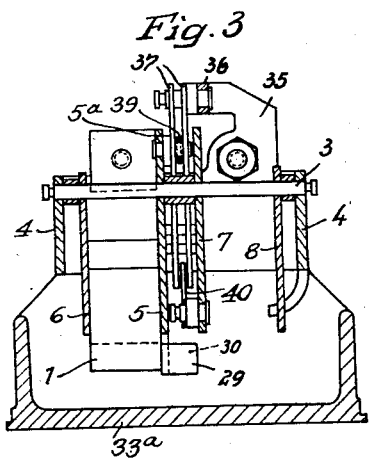
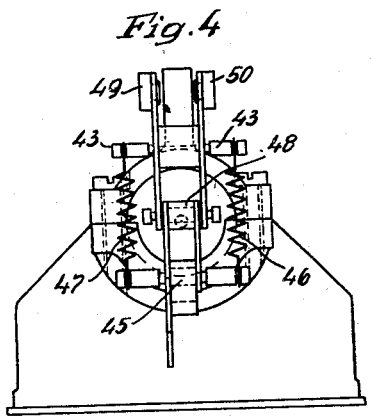
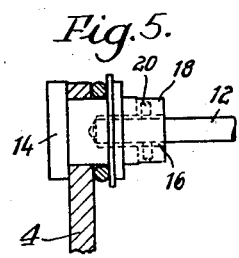
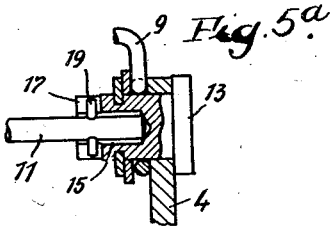
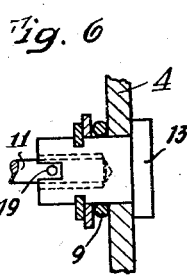
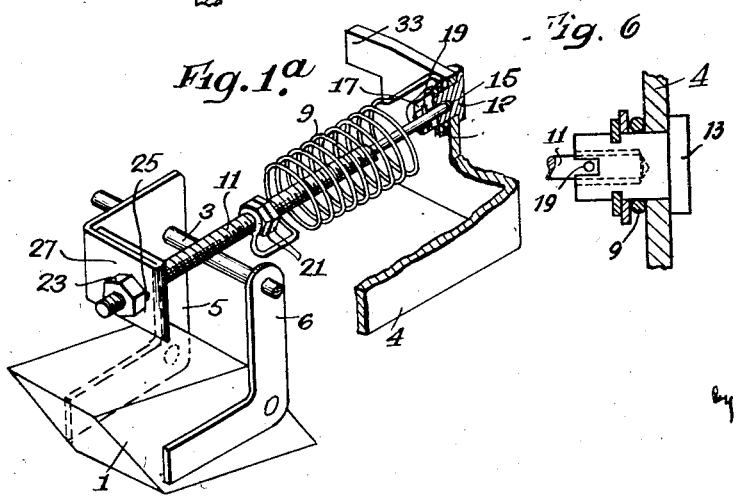

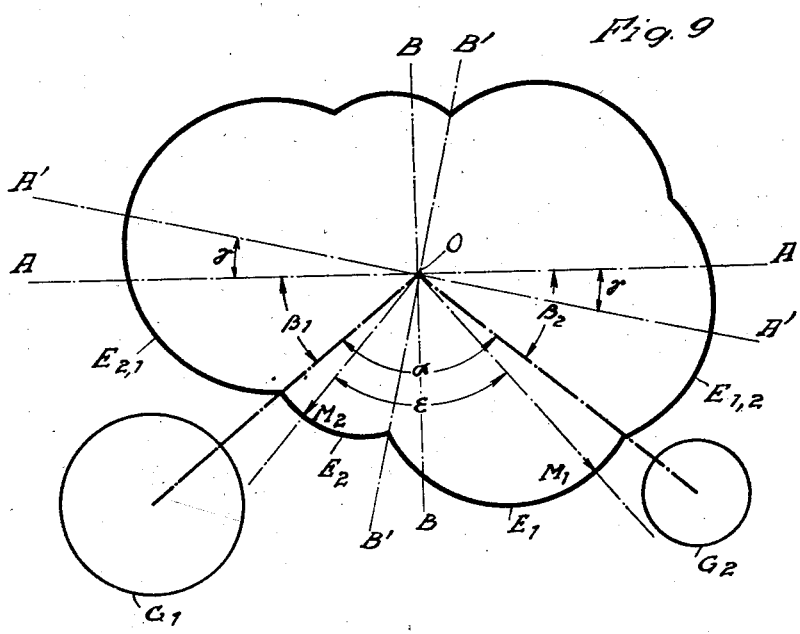
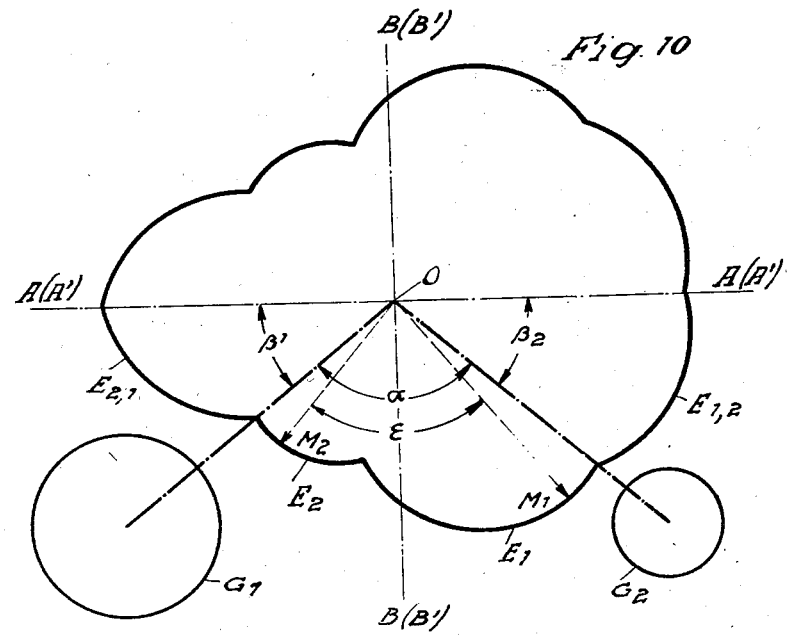

2,203,061

UNITED STATES PATENT OFFICE 2,203,061

APPARATUS RESPONSIVE TO ACCELERATIONS

Erich Schmettow, Berlin-Staaken, Germany, assignor to Siemens Apparate und Maschinen Gesellschaft mit beschränkter Haftung, Berlin, Germany, a corporation of Germany Application May 31, 1938, Serial No. 211,093
In Germany August 29, 1936

6 Claims. (Cl. 264—1)

The invention relates to an apparatus responsive to accelerations.

An object of the invention is to provide at least two masses serving as elements responsive to acceleration.

A further object of the invention consists in arranging the two masses responsive to acceleration relatively to each other in such a manner that the apparatus has a different sensitivity with respect to two axes perpendicular to each other.

Another object of the invention is to provide a novel acceleration responsive device comprising a pair of masses so mounted and arranged that the sensitivity characteristic of the device is a function of the separate sensitivity characteristics of the respective masses and also a function of the combined sensitivity characteristics of both of said masses.

Still another object is to provide a novel acceleration responsive device comprising a pair of masses so mounted and arranged that said masses act separately during one condition of acceleration and operate in unison during another condition of acceleration.

Another object of the invention is to provide means which serve to transmit the adjusting motion from the apparatus to a control device, the element serving to transmit the adjusting motion being coupled in a certain manner with the masses responsive to acceleration.

A still further object of the invention consists in designing the apparatus in such a manner that the effective accelerations may have any direction.

Further objects of the invention will be apparent from the following description taken in connection with the accompanying drawings in which a plurality of embodiments of the invention are shown by way of example and in which Fig. 1 shows a side elevational view of the apparatus, partly in section.

Fig. 1a is a perspective view illustrating in more detail the relative arrangement of certain elements of Fig. 1.

Fig. 1b is a view, partly in section, illustrating in more detail the relative arrangement of certain other elements of Fig. 1.

Fig. 2 is a top view of the apparatus.

Fig. 3 is a section taken on line III—III of Fig. 1.

Fig. 4 is a front elevational view of the apparatus.

Figs. 5, 5a and 6 show details of the apparatus, partly in section.

Fig. 9 is a graph of a sensitivity characteristic of the apparatus for two unequal masses of any magnitude responsive to acceleration, with the support axis of the apparatus at an angle to the longitudinal axis of the craft.

Fig. 10 is a graph of a sensitivity characteristic for two masses of any magnitude and of any ratio of sensitivity in two directions perpendicular to each other.

Figure 7:
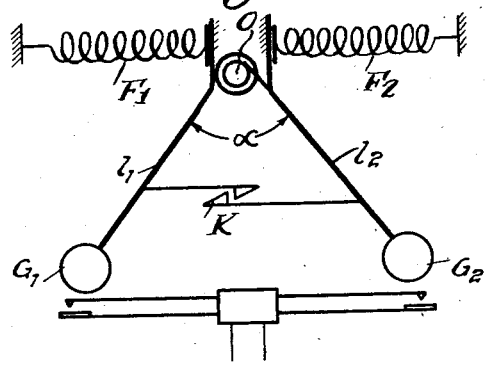
Fig. 7 is a diagram illustrating the fundamental mode of operation of the device.

For the sake of clearness only a single mass responsive to acceleration is represented in the embodiment shown in Figs. 1 and 1a. The relative arrangement of the two masses responsive to acceleration will be apparent from Fig. 2.

In Figs. 1, 1a and 2, 1 and 2 denote the two masses responsive to acceleration which may have any form, for instance, the parallelepipedic form shown in the embodiment. In this embodiment the two masses responsive to acceleration are pivotally suspended as a pendulum on a common suspension axis provided by a shaft 3 and move therefore in parallel planes. The two masses are each mounted on the suspension axis by two angular supporting arms, 5, 6 and 7, 8 respectively. The suspension axis 3 is firmly mounted in a frame-like support 4 and is substantially within the plane of the frame.

Each of the two masses responsive to acceleration cooperates with a spring responsive to the forces acting on the mass. A helical spring 9 is provided for the mass 1 and a helical spring 10 for the mass 2. Between the respective mass and the spring cooperating therewith, there is arranged a coupling element, such as the coupling element 11 for the mass 1 and the coupling element 12 for the mass 2. This coupling element illustrated as a rod threaded throughout the greater part of its length which is connected at one end by means to be described later with the appertaining mass, while the other unthreaded end of the coupling element is mounted as shown in Figs. 5, 5a, and 6 taken together with Figs. 1, 1a, and 2. Bushings 13 and 14 respectively having bores 15 and 16 respectively and slot-shaped recesses 17 and 18 respectively are provided for each of the two coupling elements in the frame 4. The two control rods are illustrated as having a circular cross-section and the cross-section areas are sufficiently small so that they are freely socketed in the respective bores 15 and 16, as is clearly illustrated in Fig. 5a. Adjacent the freely socketed ends of the two rods are arranged cross pins 19 and 20 respectively which are guided in the corresponding slots 17 and 18 of their bushings and thus prevent the control rods from being rotated about their longitudinal axis. The ends of the control rods as stated above are arranged in the bores with such a clearance that under operating conditions they may freely pivot in their sockets. Furthermore, the control rods may be displaced within the bores 15 and 16 in a longitudinal direction.

Both helical springs 9 and 10 are stressed in tension and are secured at one end to the frame 4 and at the other end respectively to the rods 11 and 12 intermediate the ends thereof. The springs are attached to the frame 4 with the aid of the bushings 13 and 14 as seen in Figs. 5, 5a, and 6 and are attached to the rods 11 and 12 by the pairs of nuts 21 and 22, respectively, so that the forces of tension are applied to the respective rods. The nuts are adjustable on the threaded portion of the control rods so that the tension of the springs may be adjusted by means of these nuts. In this manner the absolute sensitivity of both masses in their response to acceleration may be adjusted in the desired manner.

On the free end of each rod is arranged a nut 23 and 24 respectively, which is provided with diametrically opposed knife-like supporting edges such as 25. These edges engage correspondingly grooved seats such as 26, which are arranged in members 27 and 28 attached to arms 5 and 7, respectively, by means of extensions 5a and 7a, respectively. Both rods 11 and 12 freely extend through the enlarged bores formed in the respective members 27 and 28. In this manner both rods 11 and 12 are coupled in a noval and effective manner for movement by the masses under the influence of acceleration. At the same time both masses are adjustably connected to the two helical springs 9 and 10 through the rods 11 and 12. Both nuts 23 and 24 are adjustable with the aid of a thread arranged on the respective rods. By means of this device, the respective angular relationship of the masses may be adjusted in the desired manner. The angular relationship of the masses is determined by the angle formed between the line connecting the center of gravity of the masses with the axis of rotation and the vertical plane passing through this axis of rotation.

A particular advantage of this arrangement lies in the fact that both the suspension angle of the masses and the bias of the springs absorbing the mass forces are adjustable independently of each other by one and the same coupling member.

By means of a special device both masses responsive to acceleration are caused to act together against a single biasing spring. At both interiorly arranged supporting arms of the two masses are provided, inwardly extending lateral detents 29 and 30 respectively which as will be seen particularly from Figs. 1 and 3, are in alignment longitudinally of the device so that they can engage one another. With the aid of this coupling device both masses are caused to cooperate with one another in the case of accelerations occurring in certain directions, the amount of effect of each mass depending upon the size of the mass, its pendulous length and its angular position, the effects produced by both masses being transmitted to the same spring.

The operation of the above-mentioned arrangement will now be explained in its barest fundamentals by reference to the diagram shown in Fig. 7 and to the curve of sensitivity disclosed in Fig. 8. In Fig. 7, $G_1$ and $G_2$ respectively denote the two masses responsive to acceleration. Both masses are suspended in the form of a pendulum with the aid of the two supporting arms $l_1$ and $l_2$ respectively and are rotatably arranged about the common axis of rotation 0 (see Fig. 8). The mass $G_1$ cooperates with a spring $F_1$ which absorbs the mass forces and the mass $G_2$ cooperates correspondingly with a similar spring $F_2$. The supporting frame in which the complete device is arranged is indicated by its axis A—A in Fig. 8. Between the two masses is provided a coupling device K of the type disclosed above by means of which the two masses may be coupled in the above-mentioned manner. As will be seen from the schematical representation both masses are arranged in symmetrical relation to each other and to the axis A—A of the supporting frame. The angle which is enclosed between the pendulum axes, which coincide with the theoretical connecting lines of the centers of gravity of the masses with the axis of rotation 0, is denoted by $\alpha$.

Figure 8:
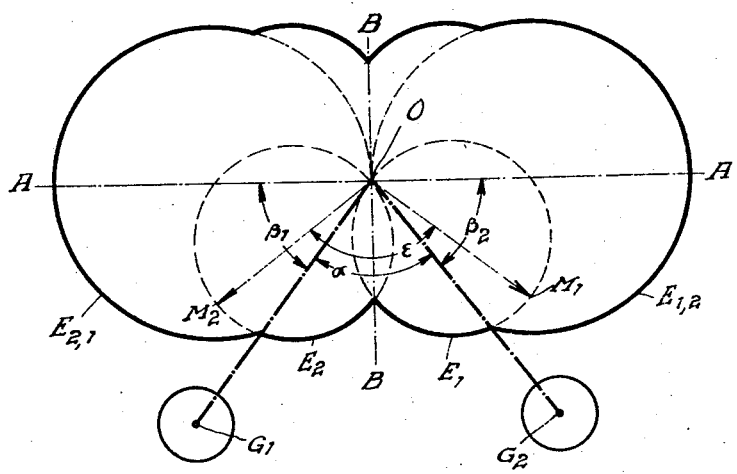
Fig. 8 is a graph of the sensitivity characteristic of the apparatus for accelerations acting in any direction.

In Fig. 8 is shown the sensitivity characteristic for the arrangement schematically represented in Fig. 7. By sensitivity characteristic is meant a curve indicating the combined value and direction of the acceleration to which the device is sensitive. In the curves of Figs. 8, 9, and 10, the reciprocal of the acceleration value is plotted, so that a great distance represented by a line drawn from the center 0 to a point on the envelope of the curve remote from 0 represents that the apparatus is responsive to a very small value of acceleration in the particular direction in which the line is drawn. In Fig. 8, A—A is the axis of the supporting frame and B—B is an axis perpendicular thereto. Furthermore, $OG_1$ is the direction of the pendulum axis for the mass 1, $OG_2$ the direction of the pendulum axis for the mass 2, $\alpha$ the angle betwen these both directions.

Moreover $E_1$ denotes the sensitivity characteristic determined by $G_1$ alone, $E_2$ the sensitivity characteristic determined by $G_2$ alone, $E_{1,2}$ the sensitivity characteristic determined by the sum of the masses $G_1+G_2$, $E_{2,1}$ the curve of sensitivity determined by the sum of the masses $G_2+G_1$, $OM_1$ the direction of the maximum sensitivity of acceleration for the mass $G_1$, $OM_2$ the direction of the maximum sensitivity of acceleration for the mass $G_2$ alone.

For a certain plane in which accelerations are effective, the envelope of the sensitivity characteristic is delineated as follows: From the point 0 as a partially dotted curve portion and then as a solid curve portion through A, $E_{1,2}$, $E_1$, $E_2$, $E_{2,1}$, the other point A continuing to the dotted curve portion of $E_{2,1}$ back to point 0. The individual sensitivity characteristics are obtained from the moment vectors which are effective to produce rotation around the axis of rotation 0, which vectors in turn are determined by the distance of the center of gravity of the masses from the axis of rotation O and by the effective acceleration, if the effective acceleration is resolved into the two components of a tangential and a radial acceleration, the latter being absorbed by the suspension device of the corresponding mass. The effective acceleration is an angular function of the corresponding components of acceleration, so that as position curve for the said moment vectors, a circle is obtained having the diameter $OM_1$ which corresponds to the mass in question in the direction of the maximum sensitivity of acceleration.

For the apparatus, the range $E_1$ and $E_2$ of the individual characteristics is taken into consideration. The greater range of the sensitivity characteristic of the complete apparatus is obtained from the portion $E_{1,2}$ determined by the sum of the masses $G_1+G_2$ and from the portion $E_{2,1}$ of the curve of sensitivity determined by the sum of the masses $G_2+G_1$. If both axes A—A and B—B are considered as reference axes for which a given ratio of sensitivity is required in the direction of both axes perpendicular to each other, the distance OA measures the sensitivity in the direction of the axis A—A and the distance OB for the direction coinciding with the axis B—B. The total curve of sensitivity for the instrument is in this instance symmetrical with respect to the axis B—B. It follows that both masses $G_1$ and $G_2$ are suspended at the same angle with respect to the axis A—A, namely, angles $B_1$ and $B_2$ are equal. Furthermore in this embodiment the mass $G_1$ is equal to the mass $G_2$ and furthermore the distance of the center of gravity of the masses for both masses is of the same magnitude.

So far it has been assumed that the axis A—A of the supporting frame for the masses $G_1$ and $G_2$ is firmly supported with respect to the apparatus. It is, however, preferable to arrange said axis A—A not firmly but rotatably in bearings fixed relatively to the apparatus. The whole apparatus constitutes in this manner, a pendulum which may oscillate in a plane perpendicular to the planes of motion of both masses. By this arrangement it is possible to determine the curve of sensitivity of the apparatus not only for a single plane but for all planes passing through the axis A—A. The sensitivity characteristic which is a curve for a given plane, becomes in this manner a surface of revolution, which is obtained by rotating the generating line about the axis A—A, said generating line being formed by the portion of the curve of sensitivity lying under the axis A—A.

The above-described example represents a particular instance for a symmetrical curve of sensitivity and particularly for a special arrangement of the apparatus. In the above-described embodiment it has been assumed, for instance, that the apparatus is arranged in an aircraft, preferably in a high speed airplane. In that case the apparatus is arranged so that axis A—A of the apparatus coincides with the longitudinal axis of the airplane or is parallel to the latter. The axes perpendicular to each other for which a given ratio of sensitivity in the direction of both axes is required, are consequently the longitudinal axis and the vertical axis of the airplane. From the curve of sensitivity shown in Fig. 8, it is seen that the sensitivity in the direction of the longitudinal axis of the airplane is considerably greater than that in the direction of the vertical axis. In this case particular desired conditions may be readily fulfilled. As an example, it may be assumed that the apparatus is to operate in the direction of the vertical axis only if particularly great accelerations occur in this direction, for instance, if when landing, the airplane strikes the earth forcefully.

The apparatus may, however, be easily designed for the general case in which any ratio of sensitivity may be chosen in two axes arranged perpendicularly to each other in the case of any direction of these axes and of any form of the curve of sensitivity. In the embodiment shown in Fig. 9 such an instance is shown diagrammatically. A—A denotes the axis of the supporting frame.

The two masses $G_1$ and $G_2$ are suspended in the form of a pendulum at an angle $\beta_1$ and $\beta_2$ with respect to the axis A—A. The angle which is enclosed by both masses is denoted by $\alpha$. Both masses are different in size but have the same distance from the axis of rotation O with respect to their center of gravity. The direction of the respective maximum sensitivity of acceleration of the two masses is again denoted by $OM_1$ and $OM_2$ and the angle between both directions by $\epsilon$. It is again assumed that a given ratio of sensitivity is required in two given directions perpendicular to each other. The characteristic of sensitivity of the apparatus is composed of the characteristics of the single masses or of the sum of the masses, i. e., of the portions $E_{1,2}$, $E_1$, $E_2$, $E_{2,1}$. The two directions perpendicular to each other in which the ratio of sensitivity should have a desired value are then determined by both directions A'—A' and B'—B' which are displaced by an angle $\gamma$ with respect to the directions determined by the horizontal axis A—A and the vertical axis B—B. The surface of sensitivity shown in Fig. 9, which surface may be produced by rotating the position curve symmetrical to the axis A'—A' as a generating line, would correspond in this case to a mounting of the supporting ring in the axis A'—A' provided that A—A indicates the direction of the longitudinal axis of the airplane.

In Fig. 10 is shown the characteristic of sensitivity of the apparatus for the case in which two masses $G_1$ and $G_2$ of two different sizes are arranged in the form of a pendulum at the same angle $\beta_1$ and $\beta_2$ with respect to the axis of the supporting frame A—A. Both masses enclose the angle $\alpha$, whereas the angle between the directions of the maximum sensitiveness of acceleration is again determined by $\epsilon$. In this case it is assumed that the axis of rotation of the apparatus lies in the horizontal direction and that a given radius of sensitivity in both directions perpendicular to each other of a horizontal and a vertical axis is required. The surface of sensitiveness of the instrument is then obtained by rotation of the generating line consisting of the portions $E_{1,2}$ $E_1$ $E_2$, $E_{2,1}$ about the axis A—A which in this case coincides with the axis A'—A' indicated as angularly separated therefrom in Fig. 9.

From the embodiments so far described it results that the characteristic of sensitivity is determined by the angle $\epsilon$ between the directions of the maximum sensitivity of acceleration of both masses. The shape of the position curve for the sensitivity may be chosen in any manner by the selection of the magnitude of both masses, furthermore by the selection of the distance of the center of gravity of the masses on the axis of rotation O, moreover by the selection of the angle of the oscillating axes with the bearing axis of the supporting frame. Thus, for instance, in the case of the embodiment shown in Fig. 9 a different suspending angle with respect to the axis A—A would result by rotating the axis A'—A' in the direction of the axis A—A.

In order to mount frame 4 for rotation with respect to the craft, trunnions 31 and 32 in bearings 31a and 32a carried by uprights 31b and 32b, respectively, mounted on base 33a, are provided as shown in Figs. 1 and 1b. To the frame 4 are secured flange-like parts 33 and 34, (see Figs. 1a and 2) which cooperate with the masses at certain positions thereof so as to provide a stop to prevent the two oscillating masses from exceeding a maximum deflection. A bracket 35, (see Fig. 3) secured to the frame 4 carries an arm 36 which serves to pivotally support at 36a the control device 37 pivotally connected at 37a to the member 38 which extends as a rod 38a towards the outside through trunnion 32 designed hollow for that purpose. The member 38 is operated through each of the forked levers 39 and 40 pivotally supported at 39a and 40a, respectively, to the respective arms and coupled to the control device 37 by pins on said device cooperating respectively with the forked ends pivotally connected to the corresponding oscillating mass, the free ends of the levers designed in the form of a fork engaging with journals arranged on the steering device 37.

The member 38 by means of rod 38a serves to operate a switching device which is provided for example with a toggle switch. The latter has a lever arrangement 41, 42 which rotates about a fixed axis 43—43 and which is guided with the aid of a roller or a pin 45 in a slide 44 provided on the apparatus frame. The toggle action is attained by two springs 46 and 47 connected at one end to the fixed axis 43—43 and at the other end to the pin 45 as will be seen from Fig. 4. In Fig. 1 the toggle lever system of the switch is shown in released position. In the set position the common pin 48 of the two toggle levers engages the member 38. To prevent an undesired operation of the switch in the case of great acceleration forces masses 49 and 50, (see Fig. 4) responsive to acceleration are provided on the lever 41 which holds the toggle in set position upon the exertion of such forces. The control motion of the member 38 is such that the pin 48 is moved by the member 38 only beyond the tilting point, thereafter the joint is snapped under the action of both springs 47 into its end position as shown in Fig. 1.

Figure 11:
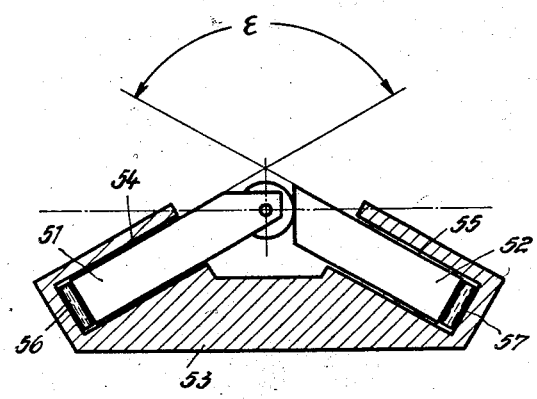
Fig. 11 illustrates an embodiment of the invention employing two masses actuating piezo-electric crystals and arranged in certain guide paths to provide pendulums of infinite length.
Figure 12:
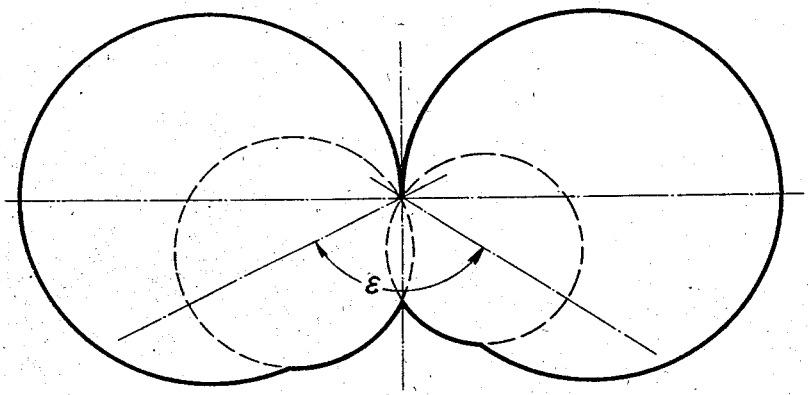
Fig. 12 represents the sensitivity characteristics of an arrangement of the masses according to Fig. 11.

As already above mentioned the shape of the two masses responsive to acceleration is not decisive nor is the particular mounting of both masses. In Fig. 11 is shown an embodiment in which two masses responsive to acceleration are employed which are not mounted in the form of an ordinary pendulum but are arranged in fixed guide bearings. The two masses are denoted by 51 and 52 respectively and are arranged in a common supporting housing 53. The two masses may, for instance, be designed in the form of cylindrical bodies or as bodies with smooth guide surfaces having, for instance, a square cross-section. The mass 51 is arranged in a guide path 54 and the mass 52 in a guide path 55 whereby a pendulous arrangement of infinite length is provided. The freedom of motion lies in the directions including the angle ε which directions represent at the same time the directions of the maximum sensitiveness of acceleration of both masses. Numerals 56 and 57 denote schematically bodies capable of the piezo-electric effect. A characteristic of sensitivity corresponding to this arrangement is shown in Fig. 12.

What is claimed is:
1. In an acceleration responsive device, a pair of masses, means pendulously mounting said masses for free oscillation about a chosen axis, a reciprocable motion transmitting member, and means for transmitting the movement of both of said masses under the influence of acceleration to said member comprising a link pivotally connected to each of said masses respectively, a pivoted member connected to said reciprocable member, pins on said pivoted member and forked ends on said pivoted links cooperating with said pins.

2. In an acceleration responsive device, a housing, a shaft mounted within said housing, a pair of masses mounted for movement about said shaft, biasing means for each of said masses limiting the movement of said masses about said shaft during one condition of acceleration, means securing said masses to operate in unison against the action of one of said biasing means during a second condition of acceleration, the other of said biasing means being rendered inoperative during said last-named condition, a control member, and means responsive to the movement of said masses for actuating said control member.

3. In an acceleration responsive device, a frame member, a supporting member mounted within said frame member, a first weight suspended from said supporting member for movement in two directions, yieldable means opposing the movement of said first weight in one direction of movement and being inoperative during an opposite direction of movement during one condition of acceleration, a second weight suspended from said supporting member for movement in two directions in a plane parallel to the movement of said first weight, a second yieldable means opposing the movement of said second weight in one direction of movement and being inoperative during an opposite direction of movement during said condition of acceleration, a control member, and means responsive to the movement of said weights for actuating said control member during movement of said weights.

4. In an acceleration responsive device, a frame member, a supporting member mounted within said frame member, a first weight suspended from said supporting member for movement in two directions, yieldable means opposing the movement of said first weight in one direction of movement and being inoperative during an opposite direction of movement during one condition of acceleration, a second weight suspended from said supporting member for movement in two directions in a plane parallel to the movement of said first weight, a second yieldable means opposing the movement of said second weight in one direction of movement and being inoperative during an opposite direction of movement during said condition of acceleration, means securing said weights to act in unison during a second condition of acceleration, a control member, and means operated by said weights for actuating said control member during movement of said weights.

5. In an acceleration responsive device, a frame member, a supporting member mounted within said frame member, a first weight suspended from said supporting member for movement in two directions, yieldable means opposing the movement of said first weight in one direction of movement and being inoperative during an opposite direction of movement during one condition of acceleration, a second weight suspended from said supporting member for movement in two directions in a plane parallel to the movement of said first weight, a second yieldable means opposing the movement of said second weight in one direction of movement and being inoperative during an opposite direction of movement during said condition of acceleration, means securing said weights to act in unison during a second condition of acceleration, one of said yieldable means operating to oppose the action of said weights when their movement is in one direction during the second condition of acceleration and being rendered inoperative when said weights move in the other direction during said second condition of acceleration, a control member, and means operated by said weights for actuating said control member during movement of said weights.

6. In an acceleration responsive device, a frame member, a supporting member mounted in said frame member, a first weight suspended from said supporting member for relative movement in response to accelerations in one direction, biasing means for opposing the movement of said weight, a second weight suspended from said supporting member for relative movement in response to accelerations in another direction, a second biasing means for opposing the movement of said last-named weight, said weights acting separately during one condition of acceleration, means carried by said weights for causing them to operate in unison during a second condition of acceleration, switch means, and means operated by said weights for actuating said switch means.

ERICH SCHMETTOW.